E. E. SAUNDERS.
FRUIT CARRIER.
APPLICATION FILED OCT. 4, 1915.
1,209,627.
Patented Dec. 19, 1916.
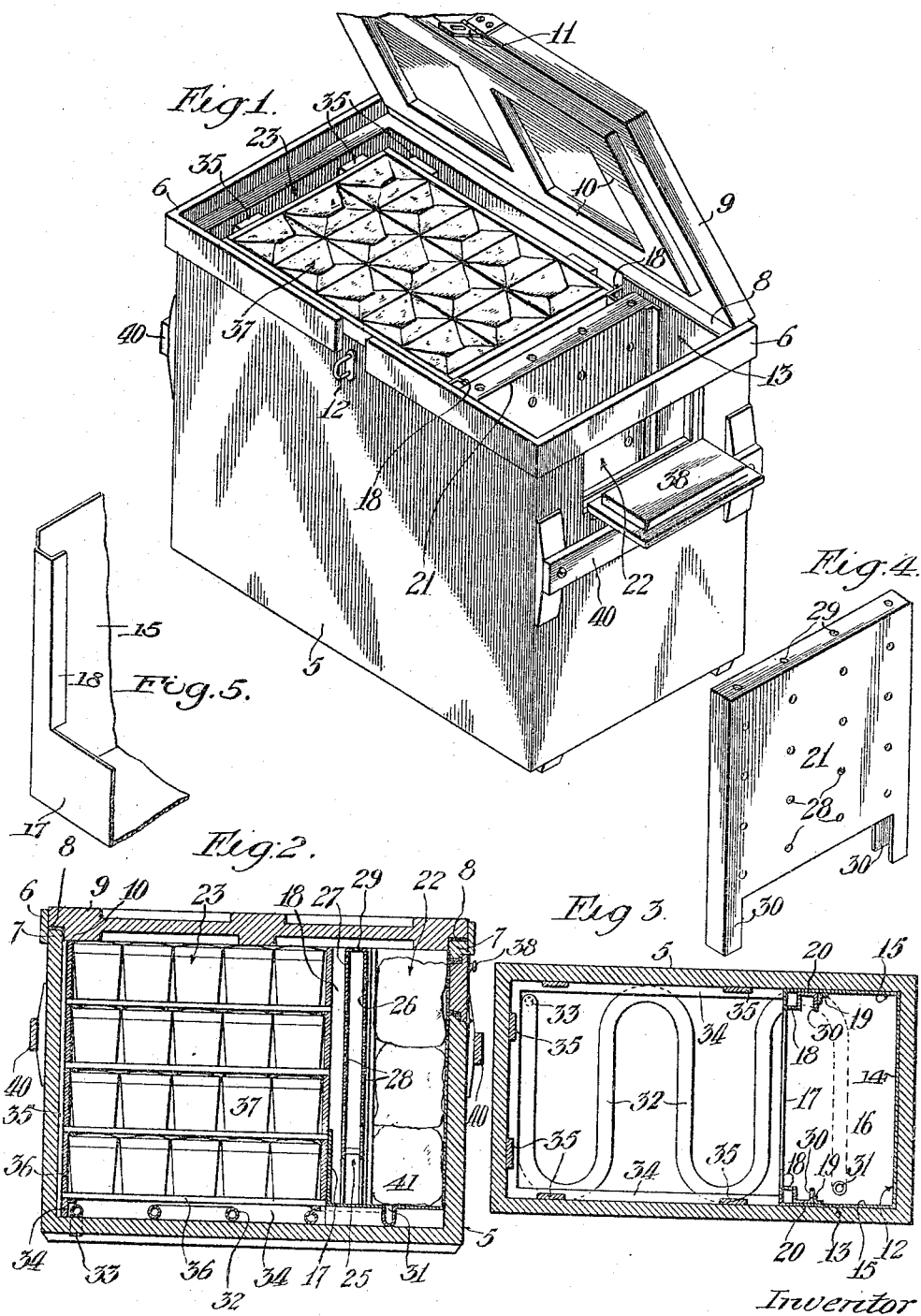
Inventor
Ethelbert E. Saunders
by Townsend, Graham, & Harris
his Attorneys

UNITED STATES PATENT OFFICE.

ETHELBERT E. SAUNDERS, OF GARDENA, CALIFORNIA.

FRUIT-CARRIER.

1,209,627.  Specification of Letters Patent.  Patented Dec. 19, 1916.

Application filed October 4, 1915. Serial No. 54,086.

*To all whom it may concern:*

Be it known that I, ETHELBERT E. SAUNDERS, a citizen of the United States, residing at Gardena, in the county of Los Angeles and State of California, have invented a new and useful Fruit-Carrier, of which the following is a specification.

My invention relates to a carrier by means of which fruit may be shipped long distances, such carrier being particularly constructed with a view to preserving the fruit in good condition during transportation, so that the fruit will be delivered in good condition to the consignee.

I am aware that cooling means, such as refrigerator cars, have been employed for the purpose of preserving fruit in good condition during shipping of same, but the most important object of my invention is to produce a carrier which may be made in a small unit of compact form, and of simple construction, having as its cooling means an ice chamber in open communication at one side with the fruit chamber, and means whereby any accumulation of moisture, either from the dripping of the ice, or from the cool air, may be caught and delivered to a receptacle in the bottom of the ice chamber, and from such receptacle piped over the bottom of the fruit chamber as an additional cooling means therefor.

Other objects and advantages will appear from the following description.

Referring to the drawings, which are for illustrative purposes only; Figure 1 is a perspective view of a carrier embodying a form of my invention, the lid of the carrier being open to disclose the interior arrangement thereof. Fig. 2 is a longitudinal section of the carrier shown in Fig. 1. Fig. 3 is a sectional plan view. Fig. 4 is a perspective view of the removable division wall between the ice box and the fruit chamber. Fig. 5 is a perspective view of a portion of the casing.

The carrier consists of a box 5 having cleats upon the bottom thereof to protect the same and facing strips 6 around the upper edge of the box which extend above the upper edge of the sides and front of the box, thereby forming a seat 7 upon which is placed a gasket of rubber or other suitable material 8 upon which the lid 9 is seated when in closed position, the under side of the lid being provided with ribs 10 which extend downwardly into the upper end of the box for the purposes hereinafter described. The lid 9 is hinged in any suitable manner along the rear wall of the box and is provided with a hinged clasp 11 adapted to engage a staple 12 on the box, so that the lid may be secured firmly in place on the box and locked thereon by the use of any suitable form of padlock which is not shown.

13 designates a sheet metal casing adapted to fit in one end of the box, said casing having an end wall 14 and side walls 15 which extend from the bottom 16 of the casing 13 to the upper portion of the carrier, so that the upper edge of the casing 13 is engaged by the ribs 10 on the lid 9 of the carrier when the same is in the closed position. The casing 13 is also provided with a fixed wall 17 at the inner end thereof, which wall extends upwardly a short distance from the bottom 16 of the casing, thereby forming a pan. The inner ends of the walls 15 of the casing 13 are bent parallel with the fixed wall a short distance and then inwardly as indicated at 18 to form one side of a guide or holder, the other side of which consists of strips of metal 19 secured to the sides 15 of the casing and extending upwardly therein parallel to the edge 18 heretofore referred to. The edges 18 and the strips 19 form guides or grooves 20 adapted to receive a removable partition 21 which divides the interior of the carrier into two compartments, namely, an ice compartment 22 and a fruit compartment 23. The partition 21 is formed of two walls spaced apart, said walls consisting of sheets of metal 26 and 27 joined at the sides and top, but open at the bottom, as indicated at 25, the sheets 26 and 27 being perforated, as indicated at 28, the perforations in the respective sheets 26 and 27 being staggered for the purposes hereinafter described. The hollow partition 21 is also perforated in the top thereof, as indicated at 29. It is to be noted that the hollow partition 21 is entirely within the pan formed in the bottom of the casing 12, and that the hollow partition is supported on the bottom of the casing 13 by means of extensions or legs 30 at each end of said partition.

31 designates a drain pipe connected into the bottom of the casing 13, said pipe being bent in a coil 32 which extends over the bottom of the fruit chamber and which is provided with an outlet 33 at the point farthest away from the connection of the said pipe with the casing 13. Placed in the bottom of the fruit chamber 23 is a series of strips or cleats 34, and on the sides and one end of the fruit chamber are a series of vertically extending cleats 35, the cleats 34 forming a seat for the lowermost of a series of trays 36, said trays being placed one above another in the fruit chamber, the uppermost tray being engaged by the ribs 10 on the underside of the lid 9. The trays 36 are engaged at their ends by means of the cleats 35 at the end of the fruit chamber and by the inwardly bent edges 18 on the casing 13, the sides of the trays engaging the cleats 35 on the front and back wall of the fruit chamber. It is to be understood that these trays may be filled with boxes of fruit, as indicated at 37, or the fruit may be packed directly in the trays, it being the practice in using a carrier of this kind to place the fruit in boxes, placing the same in the trays, as shown in Figs. 1 and 2.

38 designates a door in one end of the carrier 5, said door being hinged thereto in any suitable manner, the said door opening into the ice chamber so that the same may be refilled with ice while the carrier is in transit.

40 designates suitable handles at each end of the box.

The manner of using the carrier is as follows: The fruit being packed in boxes or baskets, as shown, and the same being wrapped in waxed paper, if so desired, the trays carrying the fruit are placed in the fruit chamber, and the cooling chamber is filled with ice, as indicated at 41. The lid of the box is then closed and the same locked in any suitable manner, the closing of the lid performing several functions, as follows: The ribs on the inside of the lid engage the upper edge of the casing 13, also the upper end of the partition 21 and the upper tray of the tier of trays in which the fruit is packed, thereby holding all of the parts in the interior of the carrier firmly in place until the fruit has reached its destination. The fruit is kept in a cool condition by means of the cooling agent in the ice chamber, the air from the ice chamber passing into the fruit chamber through the perforations 28 in the walls of the partition 21.

It is to be noted that any of the moisture on the ice chamber side of the wall 26 or the partition 21 will accumulate and flow downwardly into the bottom of the casing 13, and any accumulation of moisture from the cold air on the ice chamber walls 27 of the partition 21 will also accumulate and be delivered to the bottom of the casing 13, the perforations in the said walls 26 and 27 being staggered so that air passing through the perforations in the wall 26 strikes the wall 27 opposite thereto. Any accumulation of moisture in the bottom or pan portion of the casing 13 will be discharged through the pipe 31, thence through the coil 32 in the bottom of the fruit chamber and out through the outlet pipe 33. I have found that the removable partition 21 when made hollow, as I have described it, and having perforations placed therein, as heretofore referred to, is efficient in protecting the fruit in the fruit chamber from an undue amount of moisture which otherwise might result from the close and open proximity to the ice in the ice chamber. It is also to be noted that the casing 13 is readily removable from the carrier and that the hollow partition 21 may also be readily removed, thereby permitting a thorough cleaning of the parts of the carrier without an undue amount of labor.

In a carrier construction as above described, I have secured most excellent results in shipping berries and fruits therein over large portions of the United States, but in shipments requiring several days in transit, I have found it advisable to have the ice chamber refilled during shipment, and this may be done through the door 38 provided for this purpose in one end of the carrier.

What I claim is:—

1. A fruit carrier comprising a box open at the top, a casing in one end of said box, a pan formed in the lower end of said casing, a removable perforated partition resting on said pan in said casing adapted to divide said box to form an ice chamber in said casing and a fruit chamber in the opposite end of said box, an outlet pipe for said pan arranged in the bottom of said box extending through the fruit chamber, a series of trays in said fruit chamber, a lid for said box adapted to engage the top of the casing, the upper end of said partition and the uppermost fruit tray in the fruit chamber, and access means to said ice chamber when said lid is closed.

2. A fruit carrier comprising a box, a casing in said box at one end thereof, a pan formed in the bottom of said casing, vertically extending guides formed in the open end of said casing, a hollow perforated partition in said guides forming an ice chamber in said casing and a fruit chamber in the opposite end of said box, said partition having an open bottom arranged to deliver the contents thereof into said pan, drainage means for said pan, and a lid for said carrier adapted to engage the upper end of said partition.

3. A fruit carrier comprising a box, open at the top, a casing open at its inner end arranged in one end of said box, a pan formed in the bottom of said casing, guides formed in said casing, a vertically movable hollow partition in said guides dividing said box to form an ice chamber in said casing and a fruit chamber in the opposite end of said box, extensions on said partition supporting said partition in said pan, said partition consisting of walls spaced apart each having perforations therein, said partition being open at the bottom to deliver the contents thereof into said pan, and a lid for said box adapted to close said fruit chamber and said ice chamber.

In testimony whereof, I have hereunto set my hand at Los Angeles, California, this 25th day of September, 1915.

ETHELBERT E. SAUNDERS.

Copies of this patent may be obtained for five cents each, by addressing the "Commissioner of Patents, Washington, D. C."